Figure 1:
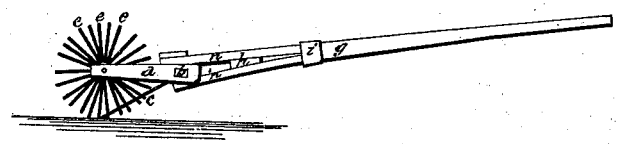
Figure 2:
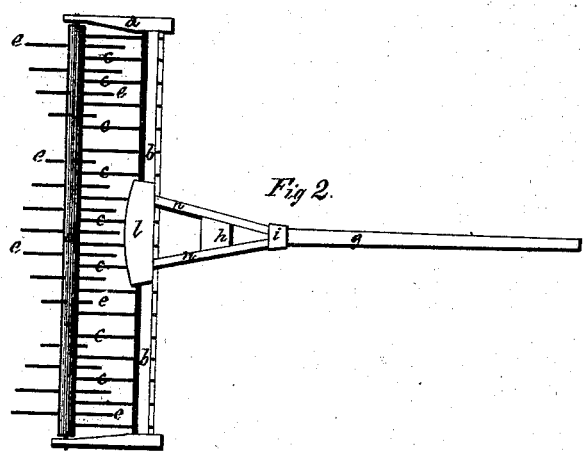
Figure 3:

L. STUDY.
Harrow.

No. 166,156.

Patented July 27, 1875.

WITNESSES:
C. W. Lemon
J. W. Garner

INVENTOR
Leonard Study
per F. A. Lehmann
atty

UNITED STATES PATENT OFFICE.

LEONARD STUDY, OF PLUM HOLLOW, IOWA.

IMPROVEMENT IN HARROWS.

Specification forming part of Letters Patent No. 166,156, dated July 27, 1875; application filed May 20, 1875.

*To all whom it may concern:*

Be it known that I, LEONARD STUDY, of Plum Hollow, in the county of Fremont and State of Iowa, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists in a revolving shaft provided with a spiral line of teeth, and pivoted to the main frame of the harrow, in connection with a series of stationary teeth, whereby said shaft is revolved as the harrow is drawn over the ground, and the harrow-teeth freed from trash, and a four-branched tongue, all as hereinafter more fully set forth and claimed.

The accompanying drawing represents my invention.

$a$ represents the frame of a harrow, in the sides of which is mortised the front bar $b$, the said bar being provided with stationary teeth $c$, which teeth slant back and downward, and have their ends on a line with the rear of the frame $a$. In the revolving bar $d$ are inserted in a spiral form the teeth $e$, which pass entirely through the bar, so as to form two rows on opposite sides, and are so adjusted as to operate between the stationary teeth $c$ in the front bar, to clear away any trash that may clog and prevent the proper working of the harrow. To the front bar $b$ is attached the tongue $g$. The rear end of the tongue is divided into four equal parts, $n\ n'$, and a block, $h$, is inserted between them to keep these parts asunder and to strengthen them. A ring or band, $i$, is placed upon the tongue, to prevent it from splitting at the point where the separation of parts $n$ begin. Two of these parts are secured under, and two on top, of the front bar, and upon the latter is the foot-board $l$, in front of the driver's seat. The block $h$ also forms a suitable place for the attachment of the draft-animals, and is used for that purpose.

Having thus described my invention, I claim—

The bar $b$, provided with the teeth $c$, and short side-pieces $a$, that form bearings for the revolving toothed bar $d$, in combination with the tongue $g$, having its end divided into four points of attachment, $n\ n'$, and strengthened by the block and ring, all of the said parts being constructed and arranged to form the harrow, substantially as specified.

In testimony that I claim the foregoing, I have hereunto set my hand this 10th day of May, 1875.

LEONARD STUDY.

Witnesses:
DAVID LEEKA,
JAMES LONG.